(No Model.)
A. SWAN.
MOLDING BULBS FOR INCANDESCENT ELECTRIC LAMPS, &c.
No. 275,730. Patented Apr. 10, 1883.
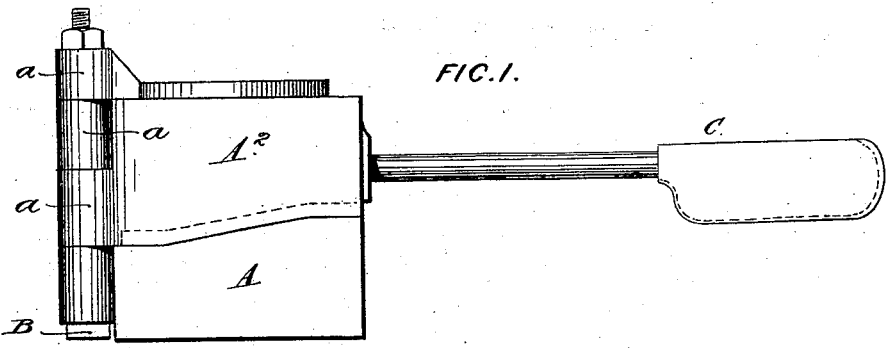
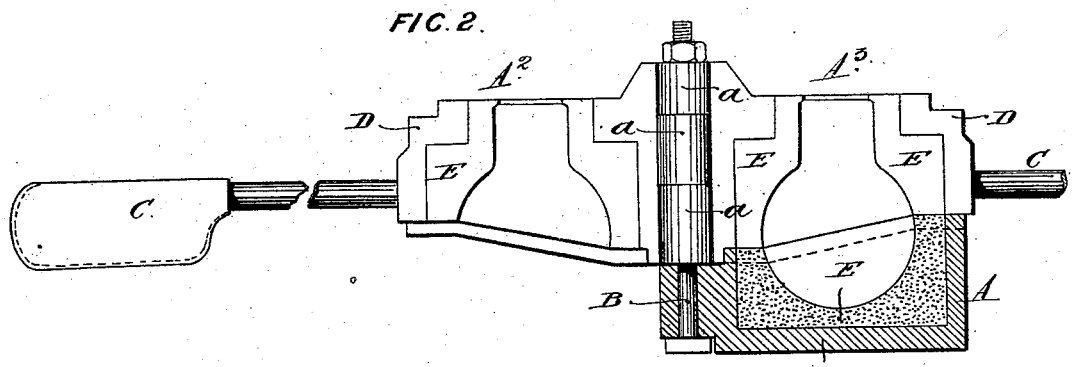
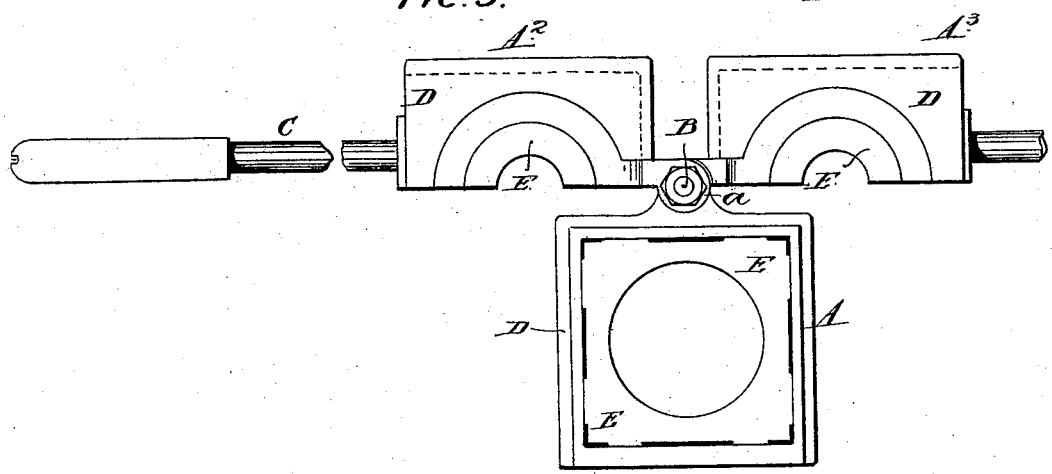

UNITED STATES PATENT OFFICE.

ALFRED SWAN, OF GATESHEAD, COUNTY OF DURHAM, ENGLAND.

MOLDING BULBS FOR INCANDESCENT ELECTRIC LAMPS, &c.

SPECIFICATION forming part of Letters Patent No. 275,730, dated April 10, 1883.

Application filed March 5, 1883. (No model.) Patented in England February 8, 1883, No. 699.

*To all whom it may concern:*

Be it known that I, ALFRED SWAN, a subject of the Queen of Great Britain, residing in the borough of Gateshead, county of Durham, England, have invented certain Improvements in Molds for Molding or Shaping Bulbs for Incandescent Electric Lamps and other Articles of Glass, (for which I have obtained a patent in Great Britain, No. 699, dated February 8, 1883,) of which the following is a specification.

The object of my invention is to provide a mold for molding or shaping bulbs for incandescent electric lamps or other articles of glass, in which molds such articles can be blown more perfectly than hitherto without mold-marks, or with but little mold-marks—that is to say, marks in the glass at the parts corresponding to those at which the junction of the portions of the mold occurs.

In constructing a mold according to my invention I form it in three parts—videlicet, a bottom part, forming the lower portion of the mold, and two top parts, forming together the upper portion of the mold. The bottom part is in one piece, and has an inclined upper surface. To this bottom part the two top parts are hinged, they being formed with lower surfaces corresponding to the inclined upper surface of the bottom part of the mold. The top parts are each provided with handles or other means for opening out the said top parts clear of the bottom part. The parts of the mold may be made of any suitable material; but they are preferably made of plumbago or carbon agglomerate incased in some suitable material, preferably iron, or of steatite or soapstone incased in some suitable material, preferably metal. The parts of the mold being closed into position, the glass is blown and rotated therein, and, owing to the hereinbefore, described arrangement and formation of the parts, the lower part being without joint and the lateral division being inclined, the articles, when released from the mold by opening out the top parts, will be found free or nearly free from mold-marks.

In order that my said invention may be fully understood, I shall now proceed more particularly to describe the same, and for that purpose shall refer to the several figures on the annexed sheet of drawings, the same letters of reference indicating corresponding parts in all the figures.

Figure 1 is a side elevation of a mold (in its closed position) constructed according to my invention for molding bulbs or globes for incandescent electric lamps. Fig. 2 is an elevation of the said mold, showing one of the top parts opened out and the bottom part in section. Fig. 3 is a plan showing the top parts fully opened out clear of the bottom part.

The mold is made in three parts, A A² A³, the bottom part, A, being in one piece, and the top parts, A² A³, are connected thereto by a hinge-pin, B, passing through lugs $a$, formed on the said top parts, which are each provided with a handle, C, so as to facilitate their being closed over the lower part, A, and opened out therefrom.

The outer part or casing, D, of the mold may be of metal or wood, while the inner part, E, for imparting to the article to be molded the desired form, may consist of any suitable material; but it is preferred to employ plumbago, or carbon agglomerate, or steatite, or soapstone for the purpose.

The upper surface of the lower portion, A, of the mold has an inclined surface, as shown, and the under surface of each of the top parts, A² A³, is similarly inclined, so that when the mold is closed, as shown in Fig. 1, the line of division between the bottom part, A, and the two top parts, A² A³, will be at an angle to the base of the mold, and at an angle other than a right angle to the axis of rotation of the article being molded.

The article to be molded is produced by blowing the glass into the mold in its closed position and rotating it at the same time in the mold, which may be effected in the usual manner; but by constructing the mold in the manner described it is obvious that by reason of the bottom part of the mold being in one piece and the junction of the mold being inclined to the axis of rotation the molded article will be free or nearly free from mold-marks.

I claim—

1. The mold for molding or shaping bulbs for incandescent electric lamps or other articles of glass, the said mold being constructed with a bottom part in one piece and with an inclined upper surface and with separate top parts similarly inclined on their under surface, substantially as hereinbefore described, and illustrated in the accompanying drawings.

2. In molds for molding or shaping bulbs for incandescent electric lamps or other articles of glass by blowing and rotation in the mold, the combination of a bottom part in one piece with divided top parts capable of being closed over the bottom part to complete the mold and opened out therefrom to release the molded article, said parts being made of or lined with lubricating or anti-friction material—such as plumbago, carbon agglomerate, steatite, or soapstone—substantially as hereinbefore described with reference to the accompanying drawings.

3. The improvement in molding bulbs for incandescent electric lamps and other hollow articles by blowing and rotating the same in separable closed molds having a solid bottom, so that all liability to mold-marks on the corresponding part of the bulb is avoided, substantially as described.

In testimony whereof I have signed my name to this specification in the presence of two subscribing witnesses.

ALFRED SWAN.

Witnesses:
   ROBT. GREENE WATSON,
*Solicitor*, 141 *Pilgrim Street, Newcastle-on-Tyne.*
   J. W. BASTON,
   *Clerk to Messrs. Watson & Dendy, Solicitors, Newcastle on-Tyne.*